United States Patent [19]

Thompson

[11] Patent Number: 4,599,240
[45] Date of Patent: Jul. 8, 1986

[54] CELLULOSE FOOD PRODUCT AND PRODUCTS RESULTING THEREFROM

[76] Inventor: Jerome B. Thompson, Box 231 - Rte. 3, Cumberland, Md. 21502

[21] Appl. No.: 534,209

[22] Filed: Sep. 21, 1983

Related U.S. Application Data

[60] Division of Ser. No. 330,957, Dec. 15, 1981, Pat. No. 4,486,459, which is a continuation-in-part of Ser. No. 97,348, Nov. 26, 1979, Pat. No. 4,307,121.

[51] Int. Cl.$^4$ .............................................. A23L 1/20
[52] U.S. Cl. ...................................... 426/634; 536/82
[58] Field of Search ...................... 127/37, 29; 536/56, 536/82, 53; 162/66, 85, 87–89, 91, 99, 77, DIG. 5; 426/431, 436, 634, 655, 539, 658, 478; 424/362, 14

[56] References Cited

U.S. PATENT DOCUMENTS

| | | | |
|---|---|---|---|
| 2,226,356 | 12/1940 | McCarthy et al. | 8/108 |
| 2,231,953 | 2/1941 | Ruzicka | 162/99 |
| 2,962,413 | 11/1960 | Hatheway | 162/89 |
| 3,278,519 | 10/1966 | Battista | 536/56 |
| 3,489,742 | 1/1970 | Gerull | 536/56 |
| 4,239,906 | 12/1980 | Antrim et al. | 536/56 |

OTHER PUBLICATIONS

Battista et al, Industrial and Engineering Chemistry, v. 54, No. 9, pp. 20–29, 9/62.

*Primary Examiner*—Hiram H. Bernstein
*Attorney, Agent, or Firm*—Fidelman, Wolffe & Waldron

[57] ABSTRACT

A process is provided for the processing of certain organic agricultural foodstuff by-products normally having little commercial value to produce a cellulosic product suitable for human consumption or use in various products. The process of the present invention is characterized by subjecting a variety of certain agricultural by-products having little commercial value, such as, for example, soybean hulls, to a series of separate steps utilizing certain chemical treating to effect a solubilizing and removal of the non-cellulosic components of the by-product agricultural material to produce residue solids which consist essentially of cellulose. The cellulose residue solids are subjected to specified purification procedures and thereafter dried to produce a short, fine fibered cellulose which may be processed to a fine powdered state suitable for use as a component part in a wide variety of edible or otherwise useable products by humans, an example of such a product being a low calorie bread.

6 Claims, 2 Drawing Figures

CELLULOSE FOOD PRODUCT AND PRODUCTS RESULTING THEREFROM

RELATED APPLICATION

The present application is a division of my application Ser. No. 330,957 filed Dec. 15, 1981 now U.S. Pat. No. 4,486,459 granted on Dec. 4, 1984, which, in turn, is a continuation-in-part of my application Ser. No. 97,348 filed Nov. 26, 1979, now U.S. Pat. No. 4,307,121 granted on Dec. 22, 1981.

BACKGROUND OF THE INVENTION

Cellulose, in general, is an ubiquitous polysaccharide present in higher plants, such as trees, and functions as the structural material of the cell membranes and is a major contributor to the shape and rigidity of such plants. Such cellulose is a high molecular weight, largely linear compound composed of D glucose units joined by $\beta 1,4$ glusodidic bonds. Cellulose is a naturally occurring polymer, like, for example, a starch, but unlike starch which is a reserve polymer of glucose with predominantly $\alpha 1,4$ glucosidic bond, cellulose is not digested by most animals, including humans, to a glucose constituent. As a result thereof, cellulose, since it is non-nutritional for human use, the sources contemplated for the production of cellulose has been a problem.

The commercial source heretofore employed for the production of a relatively pure cellulose has been from higher plants and has principally been directed at producing a fibrous cellulose for use in the production of felted cellulosic products, such as, for example, paper. To a lesser extent, cellulose has also been produced from higher plants for use in the preparation of cellulosic polymers which are employed in the textile industry in the production of explosives and in various other industrial products.

The primary source of cellulose for use in the production of paper is wood, which contains about 50% cellulose, from which such wood the cellulose can economically be separated in relatively pure form, with the cellulose possessing excellent color and having a satisfactory fiber length and strength. In the other industrial operations employing cellulose, such cellulose will require a higher degree of purity and thus must employ highly purified wood or treated cotton linters as the raw material from which the cellulose will be extracted. Other sources of cellulose that have been contemplated heretofore in an effort to offset increased costs of wood and cotton linters have included many other woody or fibrous plant materials, such as, corn stalks, rice, and like straw material, hemp, bagasse, and other materials of a like nature.

In recent years, however, highly purified cellulose in a finely divided or powdered form has been produced and proposed for use as a material suitable for human consumption or human use. Such uses have included the use of the cellulose as an excipient in pharmaceutical tableting, as an inert filler in various products, and as a filter aid in the purification of various liquid compounds in the processing thereof. Such cellulose has also been proposed more recently as a component for use in various foodstuffs, such as, for example, a bulking agent in bread. In this particular use, the cellulose functions to impart fiber or roughage to the bread, thus enhancing the dietary characteristics of the bread. Such use in bread products also functions to reduce the overall calorie content of the bread without reducing the volume of the product. For such use as a bread additive, the cellulose employed heretofore has been quite expensive since the cellulose costs two to five times as much as the starch and sugar, which have been employed heretofore for similar purposes in bread.

In an effort to provide highly purified cellulose which will satisfy the requirements of human consumption and use, deciduous woods, to wit, hard woods, have been employed as the feedstock for the production of the powdered cellulose, since such woods produce a finer cellulose fiber. In the production of cellulose fibers from such woods, the barked wood is chipped into small pieces and thereafter cooked and digested at an elevated temperature with a mixture of sodium hydroxide and sodium sulfite solution to dissolve and remove the largely ligneous cementum of the wood. This operation produces a pulped cellulose material which is subjected to a bleaching operation and thereafter the cellulose is extracted by means of a sodium hydroxide solution treatment in a multi-staged process, which is necessary to get the purity required. This procedure is essentially a paper making operation and the resulting end product is then ground to produce the cellulose powder sought. The chopping and grinding of the paper product to produce the cellulose powder is a tedious and difficult procedure. It is to be noted that equally pure cellulose obtained from more economical soft wood cellulosic material, being coarser, cannot conveniently be powdered to the desired fineness.

Powdered cellulose derived from hard wood possesses a fundamental disadvantage as a food component, even though its use is indicated both physiologically and technically to be desirable. For example, powdered cellulose is included in the Food Chemicals Codex II NAS-NRC (1972). This disadvantage is due to the fact that the source of the cellulose, to wit, hard wood, does not connote edibility.

Another cellulose contemplated for use as a food component is microcrystalline cellulose, which is a highly purified non-fibrous cellulose. The cellulose is prepared from purified cellulose obtained from wood or cotton sources by a process of caustic solution and reprecipitation which somewhat reduces the native molecular weight and yields a high purity versatile product. The product so produced is comparatively expensive and has found limited uses in foods, but has been found to be an excellent excipient for drug use. It is listed in the National Formulary and in the Food Chemicals Codex II.

In an effort to eliminate the foregoing disadvantages, a principal objective of the present invention is directed to the production of a purified powdered cellulose from a source having a definite connotation of edibility. Another object is to provide a process of sufficient simplicity that can be utilized with an existing food processing factory, such as, for example, a soybean processing plant or a wet corn processing plant and using as the raw material source for the cellulose the fibrous by-product of the mill, which would normally be discarded. A further object of the present invention is to provide a process for producing a purified cellulose which, by reason of its fine and short fiber character, is inferior for use in paper manufacture but superior for the production of powdered cellulose suitable for use as a food or drug compound. Still another object of the present invention is to provide a powdered cellulose which is not only economically superior to the cellulose derived from wood, but also is functionally superior for food and drug applications because of its enhanced surface area.

SUMMARY OF THE INVENTION

This process forming the basis of the present invention produces a purified and sterile cellulose powder suitable for use as an additive for products to be consumed by humans from certain materials which are by-products from agricultural sources which normally are of little commercial value. Such by-product material constituting the feed is placed in a water dispersion and thereafter thoroughly oxidized with chlorine gas and then cooked to solubilize a large portion of the non-cellulosic material present in the feed, with such solidified material being thereafter removed by filtration or centrifugation. The mass of solids is again slurried in water, chlorinated again, heated to remove excess chlorine, and enough soluble caustic is thereafter added to place and maintain the mixture in a distinctive basic state, and the mixture is then further cooked a second time. The cooked mixture is then subjected to a filtering or centrifuging operation to remove substantially all of the remaining non-cellulosic components in the mixture. The solids present in the aqueous mixture are chlorinated a third time, heated to boiling and separated. The residues consisting essentially of cellulose are extracted and rinsed with alcohol or similar solvent to remove lipoids and will also aid in removing water. After drying the product, the resulting short, fine fibered cellulose is easily reduced to powder form by milling and classifying and is used in food products as an ingredient, in drugs as a diluent and excipient, in talcum powder as a non-allergic component, as a filter aid in beverage production, and in any other material contemplated for human useage.

DESCRIPTION OF THE DRAWING

Reference is now to be had to the drawing wherein.

DETAILED DESCRIPTION OF THE INVENTION INCLUDING PREFERRED EMBODIMENTS

The raw materials to be employed in the process of the present invention for the production of purified cellulose may be any relatively non-ligneous, edible agricultural by-products having a significant alpha cellulose content present therein. The cellulose content of such agricultural by-products can be estimated approximately by determining the crude fiber content thereof by analytical procedure (AOAC 7.050-7.054). This crude assay actually removes 20-60% of the cellulose but leaves significant quantities of hemicellulose and lignins that may be present.

Examples of certain edible agricultural by-products suitable for use as the raw materials in the present invention and an approximation of their usual analytical character in accordance with AOAC analytical procedure are indicated in the following table calculated to a bone dry basis. The equilibrium moisture present is normally about 5%.

| Raw Material | Crude Fiber | Ash | Crude Protein** | Lipids (Ether Extract) |
|---|---|---|---|---|
| Soybean hull | 43% | 4.4% | 8.9% | 2% |
| Pea hull | 35% | 3.0% | 14.4% | 1% |
| Corn bran | 20% | 1.7% | 5.5% | 2% |
| Beet pulp-dried | 23% | 4.2% | 8.9% | .6% |
| Black-eyed pea hull | 65.6% | 2.96% | 1.12% | 1.1% |

**Amine nitrogen × 6.25

These by-product materials are readily available in large quantity and are quite cheap in cost since most of such materials are normally discardable. Other satisfactory raw materials are readily available also and may be employed so long as such materials have a "crude fiber" of at least about 15%, a lignin. level under about 7%, and possess relatively high pectin and/or hemicellulose content. Of the agricultural by-products that may be employed in the practice of the present invention, the preferred materials are the hulls of legumes with soybean hulls being the particular and preferred raw material yielding a maximum amount of superior grade cellulose for a given amount of processing and chemical reagent expense. The process of the present invention is not applicable on a practical basis to wood, stalk portions of plants, or even the husk portions of various cereal grains.

The agricultural by-products suitable for use in the present invention can be treated as obtained from their source as by-products, but it has been found from an economical standpoint with respect to chemicals and processing time required, such by-products should first be reduced to pass through at least 20 mesh screen by a hammer milling or an equivalent procedure. The by-products in a coarsely ground granular state permit easier slurrying, faster reactions and shorter cooking times. However, particles that are finer than 20 mesh are not harmful in the process and have no apparent effect on cellulose yield.

Figure 1:
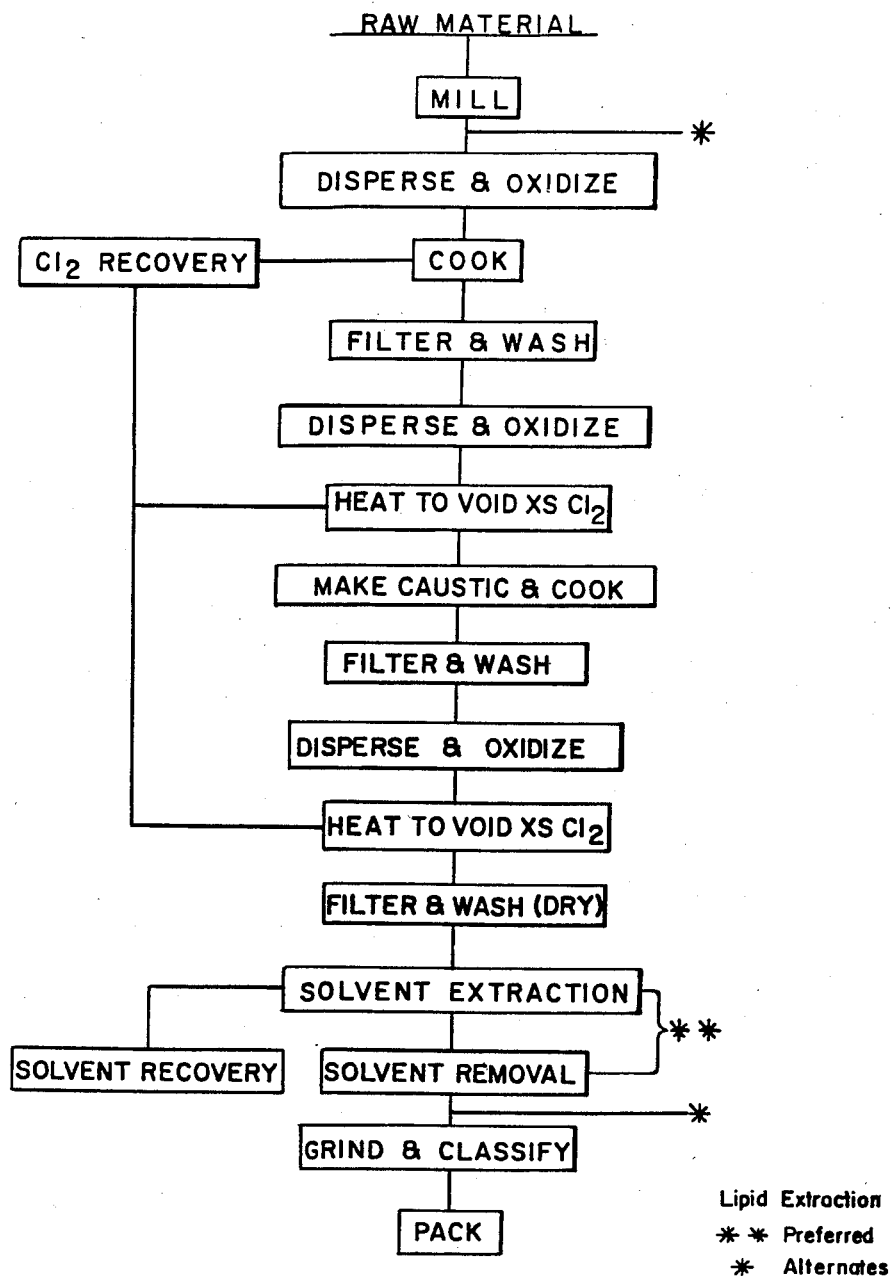
FIG. 1 shows a flow diagram illustrating a process in accordance with the present invention.

Reference is now to be had to the flow diagram shown in FIG. 1, which discloses the preferred process. One hundred parts of the agricultural by-product material in a ground state, and which may be defatted, are slurried and stirred with 600-1200 parts of water in a suitable reactor vessel at ambient temperature. This water dispersion is injected with 3-6 parts by weight of chlorine gas. The liquid should be oxidative by test and the head space should contain a trace of free chlorine gas. The chlorine reacts readily with the water to give not only dissolved chlorine but also a mixture of hydrochloric acid and hypochlorous acid in the following reaction:

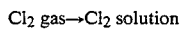

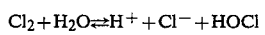

Both the chlorine and hypochlorite are strong oxidants, and the hydrochloric acid has a strong hydrolytic action as well. Equipment handling this mixture should be glass lined, Teflon, or of a material similarly resistant to wet, hot chlorine. Chlorine in solution, and particularly in a hot state, will attach the usual stainless steel reactor vessel.

The chlorinated slurry is thereafter mixed and then allowed to stand for several hours, i.e., 6-18 hours, until oxidation of labile portions of the feedstock is completed. It will be obvious that the susceptibility of the feedstock will effect the amount of the oxidant consumed and that with a glass lined pressure vessel where heat can be applied, the processing time can be shortened. At the end of the reaction the slurry should still be oxidative by test. The oxidation of the feedstock may be enhanced by permitting same to be carried out at slightly elevated conditions of temperature and pressure, i.e., at a temperature of about 30° C. and a pressure of about 16 p.s.i. Also, by employing a rapid and high shear stirring under such conditions, the time required for the oxidation to be completed can be reduced to as little as one hour.

The feedstock mixture is then stirred and heated to boiling to eliminate excess chlorine which may be recovered in any suitable manner. Boiling and stirring of the mixture is continued for 2–4 hours at ambient pressure to dissolve and digest pectins, hemicellulose, starch, protein, mineral components, and other non-cellulosic materials that may be present in the mixture. This residue represents the bulk of the cementum present in the raw material feedstock binding together the particles of cellulose. Little cellulose will be found to be dissolved in this processing step since extending the cooking time of the feedstock mixture has little discernible effect on the ultimate yield.

The well pulped mixture is now transferred in a hot state to a suitable filter or centrifuge for further separation and processing. Since the strong oxidant is no longer present, standard acid-base resistant stainless steel processing equipment may be used for the particular processing step. The filter cake resulting from the separating step is rinsed repeatedly with hot water until the washings are free of color and strong acid. The filter cake will be found to be somewhat reduced in bulk and is now returned to the reactor and is slurried with 500–800 parts of water and saturated with chlorine by injecting the cake slurry with 2–5 parts of chlorine gas while stirring same. The chlorinated mixture is treated as before to oxidize the slurried mixture. This oxidation time required in this step of the process is usually a little shorter.

The reaction mixture is thereafter heated to boiling to void the excess chlorine that may be present. With continued stirring, a 10% solution of sodium hydroxide is added until the mixture is distinctly basic, i.e., at least about a pH of 10.

The amount of sodium hydroxide obtained will vary but usually about 6–10 parts by weight will achieve the desired basicity. The reaction mixture should be maintained at an elevated pH through a further cooking period of about ½ to 2 hours at ambient pressure. Obviously other strong, soluble hydroxides and carbonates can be employed equally as well so as to achieve the basic reaction, but sodium hydroxide is the preferred reagent. The introduction of the basic compounds are believed to result in the formation of some chlorates which briefly act as a very potent oxidant, the reaction being as follows:

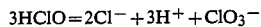

$$3HClO = 2Cl^- + 3H^+ + ClO_3^-$$

Typically the reaction mixture rapidly turns very dark, almost black, in color at this point. The oxidizing action will be found to disappear quite rapidly.

The cooking period while maintaining the mixture in a basic state completes the removal of materials present in the feedstock which are insoluble in neutral or acid solutions, as well as hydrolytic products of lipids, phenolic coloring agents, and amino acid and protein residues and the like. Pulp will be found to be total at this stage since the hemicelluloses present are now disintegrated and the mixture has become generally homogeneous in character. The hot basic mixture is now subjected to a centrifugal or filtering operation and the resulting cake is washed with hot water until the washings are colorless and neutral.

The cellulose material at this point in the processing will be found to be substantially pure and will be approaching white in color. The cellulose material is again slurried in the reactor vessel with 200–500 parts of water and briefly injected while stirring with 2–3 parts of chlorine gas. This amount of gas is small but may be varied if desired and is sufficient to yield a substantially white product in ½ to 2 hours. At the end of this processing step a trace of chlorine may be present by test, but it should be noted that a longer bleaching period will be found to do no harm. The excess chlorine present is thereafter removed by heating and stirring the bleached cellulose slurry, and the slurry is subjected to a centrifuging or filtering procedure and washed with hot water to completely remove any strong acid that may be present and the residue cake placed in a dry state. The resulting product is substantially white in color and not unlike corn starch in appearance. The process as outlined above has removed virtually all the non-cellulose components of the raw material except for some mineral, i.e., silica, and some of the lipids including steroids and unsaponifiables. The cellulose cake may be dried and milled at this point if the lipids that may be present are not found to be objectionable.

In general, the lipids may be extracted in one of three ways. First, the lipids may be extracted from the raw starting material as the initial step. Alternatively, the lipids may be extracted by treating the water moist cellulose cake. Finally, the lipids may be extracted by treating the dry cellulose produced by the process.

In general, it will be found that the lipids can be most easily extracted by treating the water moist cellulose cake obtained from the final separation step above or from the dried cellulose cake by treating either with a suitable lipid solvent. The lipids can be extracted from the raw starting material or from the dried cellulose product by treating either with mixed hexanes in the same manner as such an extraction is carried out in the preparation of soy bean and other seed oils. Extraction of the lipids from water moist cellulose cake can be accomplished best by use of water miscible solvents, such as, for example, isopropyl and ethyl alcohol. This has the advantage of removing the water from the cake as well as the lipid materials thus leaving in its place a lower boiling solvent which ultimately can more easily be removed by vacuum stripping same from the cellulose. It is to be clearly understood that other solvents, such as, for example, esters, ketones, alcohols, and the like, may be used if desired. In any case, a very limited extraction has been found to suffice after processing as the lipids are not bound to the purified cellulose. The resultant material, wet with water or solvent, is stripped of this liquid by use of heat, vacuum, or both, to yield a white powder or slightly lumpy material which can readily be reduced to fine particle size by conventional means. The resultant dry powdered cellulose will be found to have a trace of nitrogen compounds present and a small ash content but, in general, the cellulose products are comparable analytically with the conventional wood derived cellulosic materials currently employed today.

The celluloses made in accordance with the present invention having a great advantage in being naturally fine and the fibers are no doubt shortened by the oxidation treatment applied even if the fibers are not altered appreciably chemically. The cellulose products of the present invention can be reduced to the 100–300 mesh size required for food and drug use by any suitable and well known milling operation. In this respect, the cellulose products of the present invention are quite unlike the long coarse fibers of processed wood or cotton cellulose which are very difficult to grind and size. Having more surface per unit weight, the cellulose produced in accordance with the present invention can carry more water and thus have enhanced functionality in the formulation of low caloric food analogs and approach the utility of the microcrystalline cellulose in drug diluent applications under more economical terms.

Figure 2:
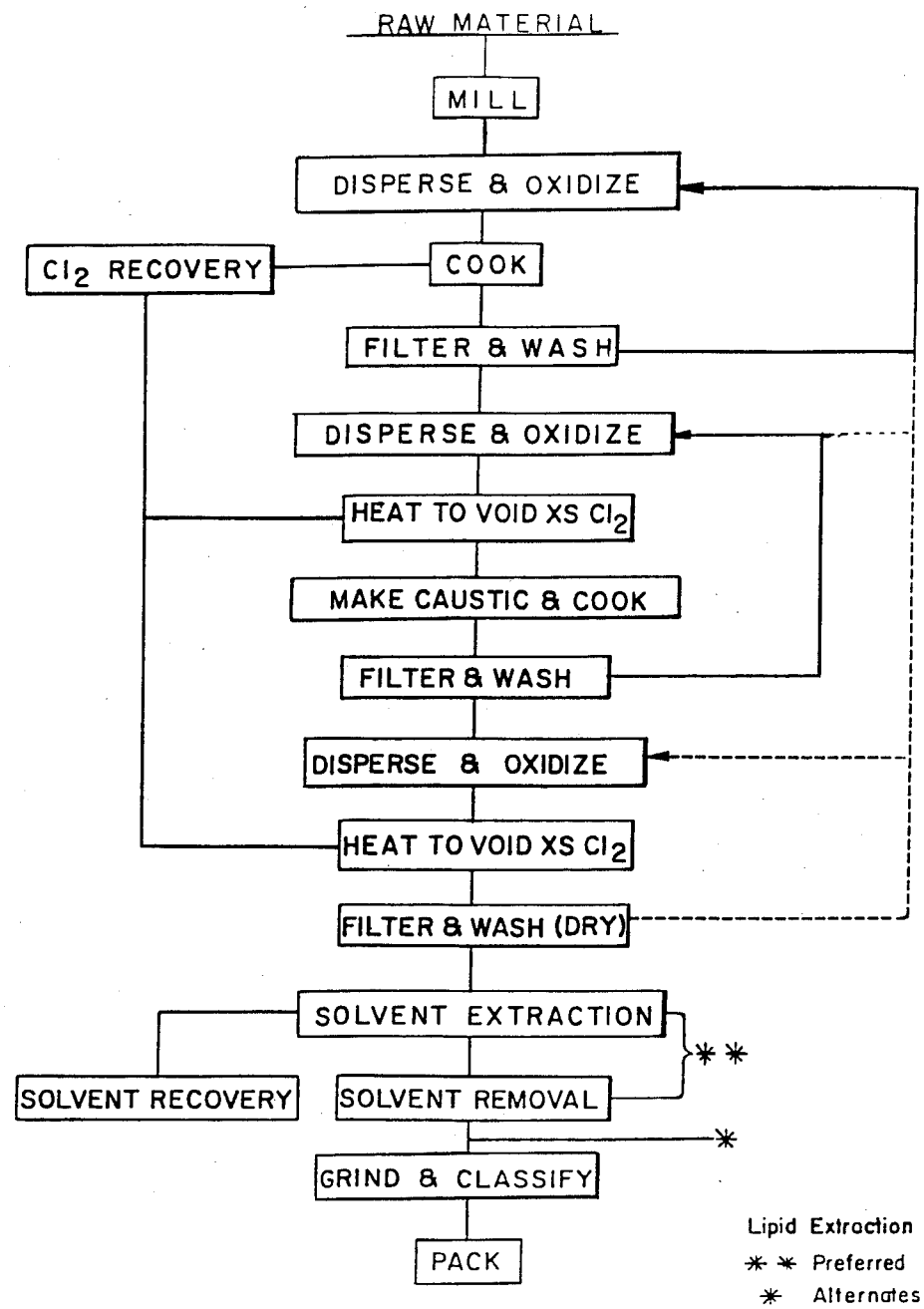
FIG. 2 shows a flow diagram illustrating a modified process in accordance with the present invention utilizing a recycling slip.

Reference is now to be had to FIG. 2 wherein a modification of the basic process shown in FIG. 2 is illustrated. The modified process of FIG. 2 was developed as a means for reducing the amount of water that is normally required in the operation of the overall process. The modified process is predicated upon the proposition that the water collected from the first filter and wash operation can be recycled back to constitute the water for the initial operation of the process. In addition to the savings in the amount of water used in the overall process, there will be a corresponding reduction in the amount of waste water that must be ultimately disposed of on a health and ecological basis. Further, the recycle modification of FIG. 2 will result in an increase yield of cellulose.

Basically, as shown in FIG. 2, the process will be carried out essentially as shown in FIG. 1. However, as shown, the filtrate from the first filter and wash operation is collected and recycled back to constitute the water to be added to the milled hulls to produce the mixable slurry that will be passed to the initial oxidation stage of treatment. After such recycling and dispersion of the filtrate with the milled raw material, the operation of the process will thereafter begin. It should be pointed out also that if the amount of filtrate collected is less than that required in the initial stage of the operation, fresh make-up water may be added. The recycling of the filtrate may be carried out more than one time. For example, the filtrate may be recycled over and over with fresh water being added as needed to supply the required amount of liquid needed for the initial slurry.

EMBODIMENTS OF THE INVENTION

As indicated hereinbefore, the by-products of edible legumes are a preferred class of materials with soybean hulls being the preferred raw material to be employed in the practice of the present invention to produce the desired cellulose. Soybean hulls are a by-product of the processing of soybeans to produce soybean oil and high protein soy meal. The soybeans (Glycine Max. Var.) favored in the United States are high oil content cultivars having a nearly spherical shape and an amber or pale yellow color. The soybeans, as received for processing, are thereafter air and screen cleaned, passed through cracking rolls and then through dehullers which aspirate the thin-walled horny and rather generally hemispherical hulls from the heavier bean chips. The yield of soybean hulls is approximately 140 pounds per ton of beans. These hulls are usually ground to about 40 mesh to increase the bulk density for packing and shipping. The ground soybean hull has some use as a feed ingredient primarily for ruminants.

EXAMPLE 1

One kilogram of ground soy hulls (approximately 20 mesh) was extracted thoroughly with hot hexanes (boiling range 65.9°–68.5° C.) using a reflux recovery type percolator. This treatment removed 20.2 gms or 2.0% of extractable, largely lipoidal, materials with an intense yellow color. The soybean hull residues, freed of solvent, were placed in a 12 liter, three necked flask equipped with an injection tube, a heating mantle and a heavy duty stirrer of stainless steel which was coated with Teflon for protection thereof, with the residues being dispersed in 6.5 liters of water. While stirring the mixture at ambient temperature and pressure, the mixture was injected slowly with chlorine gas until the color in the head space indicated an excess of chlorine. The amount of chlorine was about 40 grams. The injector was removed and the chlorine treated mixture was allowed to stand overnight, i.e., 18 hours, without stirring.

The reaction vessel was then attached to a chlorine trap consisting of a solution of caustic soda and an aspirator so that gases from head space in the flask were drawn through it. With the trap in place and the aspirator on and the stirrer in operation, the flask was heated slowly to boiling during which period free chlorine was removed from the system. Cooking and stirring at the boiling point was continued for about $2\frac{1}{2}$ hours.

At the end of this cooking period the hot mixture was filtered using a Buchner type funnel and a vacuum pump and the cake washed with hot water until the washings were colorless and the pH thereof was virtually neutral. The cake was replaced in the reaction vessel and stirred into a paste with a 4 liters of water and injected with chlorine as previously specified and the mixture allowed to stand for 8 hours. The mixture was then stirred and heated to boil and unitl the excess chlorine was expelled. While cooking and stirring 70 grams of sodium hydroxide pellets dissolved in 500 ml of water were slowly added to the pasty mixture. The pH of the pasty mixture was thereby rendered highly basic, i.e. at least a pH of 10, and the cooking of the mixture was continued for $1\frac{1}{2}$ hours at a slight simmer with stirring. The well pulped mixture was then filtered hot and rinsed with hot water to remove color and caustic.

The faintly tan filter cake obtained from the filtering procedure was returned to the reaction flask, dispersed in 3 liters of water and again treated with chlorine to excess with stirring and allowed to stand 6 hours. The dispersion was then heated to void excess chlorine and was filtered while hot and washed until neutral. The filter cake obtained thereby was substantially white and was broken up and dried at 30° C. using vacuum and was occasionally stirred during drying to minimize felting. The product was then hammer milled to pass a 200 mesh screen. The yield of cellulose product was 414 grams or 41% based on the original raw unextracted soybean hulls. The moisture content was 4.5%. The analytical characteristics on a no moisture bases were as follows: crude fiber 71.4%; ash 0.54%; crude lipids 1.25%; crude protein 0.59%, cellulose (by difference) 97.6%.

This cellulose powder was used by preparing low calorie bread as described hereinafter with rexpect to Example 2.

EXAMPLE 2

The soy cellulose produced from Example 1 was used in the laboratory production of a reduced calorie white bread using the teachings set forth in my U.S. Pat. No. 4,109,018 as set forth in Example 12 using the soy cellulose at the 20% level. A control bake with cellulose powder from a hardwood source was made using International Filter Company BH-200 alpha cellulose at a similar level.

A sponge and dough procedure was employed using the following formula:

|  | Parts by Wt. |
|---|---|
| Sponge Formula | |
| Patent flour (enriched) | 70 |
| Yeast food (Arkady) | .75 |
| Vital Gluten (Australian) | 7 |
| Yeast, compressed | 3 |
| Water | 54 |
| Dough Formula | |
| Patent flour (enriched) | 30 |
| Sucrose | 2 |
| Salt | 2.9 |
| Nonfat dry milk | 6 |
| Cellulose (Variable source) | 20 |
| Soy flour | 8.5 |
| Emplex | .5 |
| Methocel | 1.0 |
| CMC | 1.0 |
| Calcium Propionate | .3 |
| Water | 76 |

The sponge ingredients were mixed for three minutes at low speed on a Hobart Mixer equipped with MacDuffey jacketed bowl. Sponges came out at 80° F. and were allowed to ferment 3.5 hours at this temperature. The dough ingredients and water to give a dough of proper consistency were remixed with the sponge for 3 minutes in low speed and 5 minutes in second speed.

The well developed doughs were given a floor time of 30 minutes, were divided and given 10 minutes of overhead proof and were then sheeted, molded and panned. Dough pieces of 454 grams were used in pans $2\frac{1}{2}'' \times 3\frac{3}{4}'' \times 9\frac{1}{8}''$. Pan proofing was accomplished in approximately 1 hour to $\frac{3}{4}''$ above the pan lip. The loaves were baked for 20 minutes at 435° F. After cooling one hour, the loaves, in duplicate, were sealed in polyethylene bags for later examination and assay.

The two types of cellulose yielded loaves of very good quality and with equally good volume, internal characteristics and edibility. One entire loaf of each kind was weighed, sliced, dried, reweighed and ground, and subjected to total proximate analysis with the results being calculated back to the original moisture basis. The data obtained is tabulated in Table 1. Calorie content was calculated using the Atwater procedure.

TABLE 1

|  |  | Soy Cellulose | Hardwood Cellulose |
|---|---|---|---|
| 1. | Moisture | 42.76% | 42.12% |
| 2. | Ash | 2.27% | 2.25% |
| 3. | Protein (N × 5.7) | 10.28% | 10.22% |
| 4. | Fat | .17% | .44% |
| 5. | Crude fiber | 6.32% | 6.58% |
| 6. | Starch | 29.73% | 30.03% |
| 7. | Reducing Sugar | 1.38% | 1.34% |
| 8. | Sucrose | <1 | <1 |
| 9. | Assimilable carbohydrate (Sum of 6, 7, and 8) | 31.11% | 31.37% |

TABLE 1-continued

|  |  | Soy Cellulose | Hardwood Cellulose |
|---|---|---|---|
| 10. | Calories/100 gms. (calculated) | 170.83% | 173.99% |

Examination of these data indicates little significant difference, if any, in analytical characteristics. The soy cellulose might be more soluble under the rigorous treatment of the "Crude Fiber" assay being finer and exposing more surface to the reagents. The significance of the difference noted is, however, moot. The soy derivitive cellulose was highly functional and yielded a very satisfactory, well flavored white bread reduced in calories by about 37% as compared to normal white bread.

EXAMPLE 3

Forty grams of 20 mesh ground soybean hulls were dispersed in a liter reaction in about 200 ml of water to get a mixable slurry, and this was saturated with gaseous chlorine. After standing for six hours at 21° C. oxidation and chlorination were completed. The reaction mixture was stirred and heated to remove the small amount of excess free chlorine and was then stirred at a moderate rate to prevent scorching and cooked at mild reflux for 2.5 hours. The cooked reaction mixture was then filtered through a Buchner funnel while hot and washed with hot water until the washings became neutral.

The resulting tan filter cake was returned to the reactor, slurried in 200 ml of water, again chlorinated and allowed to stand about 12 hours. The reaction mixture was stirred and heated until free of chlorine by test with starch KT paper in the head space. The hot solution was then raised to pH of at least 10 by addition of sodium hydroxide solution, such addition being about 2.5–3.0 grams of the base. The caustic mixture was stirred and heated to mild reflux temperature on the order of 100° C. for 90 minutes. The resulting mixture was then filtered hot and washed with hot water until the strong caustic was removed.

The filter cake was returned to the reactor and slurried with 150 ml of water and treated briefly with chlorine. It bleached white very rapidly. It would be possible to filter this without removal of chlorine if a satisfactory resistant filter construction were used. However, in this case heating was employed to remove the excess. The slurry was thereafter filtered hot and was washed with hot water to a neutral reaction.

The cake was pumped as free of water as practicable and transferred back to the reactor and slurried in 250 ml of isopropyl alcohol. This mixture was then stirred and boiled for 15 minutes and then vacuum filtered. The filter cake was then rinsed several times with hot isopropyl alcohol. The resultant cellulose, pure white in color, was dried in an oven at 80° C. The yield was 18.0 gms or 45%. The analytical characteristics were as follows: moisture 4.61%, and on a moisture free basis; crude fiber 73.0%; ash 0.52%; crude lipids 0.56%; crude protein 0.52%; cellulose 98.3%.

EXAMPLE 4

A second soybean cellulose preparation was made in the same fashion as set forth in Example 3, except that the final filter cake pumped as dry as practicable was dried in an oven. The white product in dry form was returned to a reactor and stirred and heated with about 125 ml of isopropyl alcohol to boil for about 15 minutes. The isopropyl alcohol was removed by filtering and the cake rinsed several times with hot isopropyl alcohol. The white powdered cellulose was freed of alcohol at 80° C. The yield was 17.6 gms or 44%. The analytical characteristics of the product were: moisture 4.66% on a moisture free basis; crude fiber 71.0%; ash 0.54%; crude lipid 0.28%; crude protein 0.56%; cellulose 98.6%. This procedure exemplifies removal of the fat material from the dry cellulose powder.

EXAMPLE 5

Hulls from the yellow field pea (Pisum Sativum) are quite analogous to the soybean hulls of Example 1, except as to source. They are obtained as a by-product to the extent of about 8.2% of the field peas which are being produced in quantity in Western Canada as a result of an agricultural diversification program sponsored by the Canadian Government. The pea hulls are used for feed, but in finely ground form they have found some applications in human food as roughage. The hulls not only have a high fiber content but a significant protein content as well. The level of useage as roughage is, however, somewhat limited by the rather extreme bitterness and "beaniness" of their flavor.

Sixty grams of these pea hulls, slightly tan in color, were ground to pass a 40 mesh screen and fat material was extracted in a Soxhlet extractor for two hours with isopropyl alcohol. The crude lipids recovered from the alcohol amounted to 1.8%. The residues were freed of alcohol by heat and vacuum. The extracted pea hulls were dispersed in about 300 ml of water in a liter reactor equipped with a glass and Teflon stirrer and a fritted glass gas diffusion tube. While stirring, the mixture was saturated with chlorine as evinced by green color in the head space of the reactor. The stirrer was stopped and the system sealed and allowed to stand over night, i.e., about 18 hours. The excess chlorine was driven off by heat and the resultant near white slurry was stirred and cooked at gentle reflux for 2.5 hours. During this period pectins, hemicullulose and some starch was digested and solubilized. The pulp was then filtered off the hot amber extract and was washed with hot water until the washings were neutral.

The filter cake was dispersed in 250 ml of water and treated with a slight excess (by test with starch KT paper) of chlorine in the reactor which was stoppered and allowed to stand overnight again. The mixture was then heated to rid it of the free chlorine and was treated with 2.5 grams of sodium hydroxide in solution to reach a pH of about 10. The basic mixture was then stirred and heated to slight reflux for 1.5-2 hours and the mixture then filtered and washed until free of strong caustic. The resultant cellulose mass, a pale tan and in a well pulped state, was dispersed in 250 ml of water and was treated briefly with chlorine. The mixture was bleached white in about 15 minutes and was allowed to stand for three hours. Again, the mixture was heated to boiling to eliminate free $Cl_2$ and was filtered and washed.

The pure white product was dried in a heated vacuum desiccator at 30° C. The cellulose product in a loosely granular state was mortared to pass a 200 mesh screen. The yield of dry powdered cellulose from field pea hulls was 23.2 grams or 38.7% with a moisture content of 4.84%.

This product had on a moisture free basis a crude fiber content of 70.1%; ash 95%; lipid 22%; crude protein 0.54%; cellulose 98.3%. This powdered cellulose was of excellent quality and quite comparable in all respects to that obtained from soy hulls.

EXAMPLE 6

Corn bran is a by-product of the wet milling of corn (Zea Mays Var.) in the manufacture of corn starch. The corn bran is obtained at 3–4% of the weight of the corn processed on a dry basis. Its analytical character was indicated previously. It is usually combined with other by-products and sold as a feed ingredient, primarily for ruminants. The dry corn bran as obtained is physically rather heterogeneous in size ranging from powder to particles or scales up to 1 cm in length. It has a few dark particles but in general might be described as pale amber, translucent horny scales rather like a bee's wings.

80 grams of corn bran were reduced by grinding to particles about the size of wheat bran and having a density of about 0.3 gm/ml. The ground mixture was dispersed in 600 ml of water in a one liter flask equipped with a Teflon stirrer. The mixture was saturated with chlorine using a fritted glass diffusion tube until some color appeared in the head space. The amount of chlorine was quite small and difficult to measure accurately but apparently was between about 3 and 6 grams. The chlorinated mixture was allowed to stand with no further mixing for about 18 hours to complete the oxidation. The color changed maximally in about 4 hours from pale amber to intense yellowish brown.

After the oxidation period was completed, the mixture was stirred and cooked at a boiling temperature for about 3 hours. The excess chlorine came off very rapidly and the corn bran was placed in a thoroughly pulped state during this period. The hot mixture was filtered using a vacuum filter and, in spite of high solids content and viscosity, was found to filter readily. The resulting filter cake was washed with hot water until neutral. The filter cake was partially purified cellulose and chocolate in color.

The resulting filter cake was dispersed in 500 ml of water to make a thick slurry in a liter flask. It was injected with about three grams of chlorine with stirring. The color changed from brown to an orange pulpy mass resembling canned pumpkin. The mixture was allowed to stand for eight hours. The resulting thick orange yellow slurry was heated to void excess chlorine and then made basic with the addition of a sodium hydroxide solution, 2.5 grams of the base being sufficient to turn the mixture an extremely dark brown and to impart a pH of at least 10 to the solution. An additional 0.7 gm of caustic in solution was added as experience has indicated that 20–33% of the caustic is used up in neutralizing hydrolytic products and a pH of 10 plus provides for the best pulping reaction. The mixture was cooked at boiling for about 1.5 hours during which time there was a slight decrease in the intensity of the color of the mixture and a large decrease in viscosity. The hot mixture was vacuum filtered and washed to neutral reaction with boiling water to yield a bulky homogeneous slightly tannish cake.

The cake product was then dispersed in about 300 ml of water and injected with about 1–2 gram of chlorine gas while stirring. This mass achieved a mashed potato consistency and became substantially white in about 30 minutes.

The gelatinous mass was heated to void any free chlorine present and then transferred hot to a vacuum filter and washed with hot water until the washings became neutral. The filter cake, an oddly translucent and voluminous gel, was washed 6 times with 50 ml portions of hot ethanol to remove both water and substantial portions of lipoidal material present and then dried with heat at 80° C. The yield of slightly cream colored cellulose was 15.5 gms or 19.4% recovery.

The cellulose was converted to powder by milling and could readily be made to pass a 200 mesh screen. It had the following assay by AOAC procedures on a dry weight basis: crude fiber 57.2%; ash 0.26%; crude lipid 0.87%; crude protein 0.58%, cellulose 98.3%.

EXAMPLE 7

Sugar beets are a white or pale variety of Beta Vulgaris agronomically developed as a source of sucrose. In processing the beets for sugar, the cleaned beets, cut in fine ribbons, are extensively extracted with hot water. The extraction fluid is further processed to yield about 12.5% of refined sugar and another 2-3% as a molasses component. The pulp remaining (dry weight) amounts to about 5% of the fresh beets. This pulp is normally dried and used as an ingredient of cattle feed.

The dry beet pulp is a gray, harshly angular, twisted fibrous product. It is prone to contain bits of twig, woody rootlets, silt and sand as impurities which should be physically removed before processing to produce cellulose. For such processing the dried pulp is best hammer milled to about 10-20 mesh and air classified to remove some of the impurities. Of course, if convenient, the undried pulp can be chopped and employed with economic gains in avoiding the costly drying operation and the time needed for rehydration.

60 grams of dry ground pulp were dispersed in 700 ml of water at 50° C. and immediately injected, while stirring, with about 4-6 grams of chlorine gas in a two liter reaction flask. The mixture was then allowed to stand for 12 hours. The addition of the oxidant before the particles are hydrated aided in carrying the reactant into the pulp particles as they swell. The lead gray particulate mixture rapidly swelled, and the much enlarged particles turned yellow in color. After standing for twelve hours, stirring was again initiated and heating started. The slight excess of chlorine was rapidly driven off and the thick mixture was stirred and cooked for 3.5 hours. During this period there was a gradual decrease in viscosity as the pectins, which are present in quantity, dissolve. The cooking time for pulping the swollen particles thoroughly is somewhat longer than for other raw materials.

At the end of the cooking, the pulp possessing a consistency of apple butter was transferred to centrifuge cups, centrifuged and the supernatant discarded. The compacted mass was removed from the cups leaving the bottom tenth. This tenth was dispersed in water and the water was decanted into the mass from the cups to disperse same. The heavy material, mostly sand, left in the decanting vessel was discarded. The mass was dispersed in fresh water and centrifuged three times until the supernatant was free of strong acid.

The mass was returned to the reactor, dispersed in 700 ml of water and saturated with chlorine gas while stirring, about 3 grams being added. The mixture was then allowed to stand for 12 hours at the end of which time it was heated with stirring to remove chlorine and made strongly basic by adding a solution containing 3.5 grams of sodium hydroxide. This basic mixture was heated and stirred at a simmer for two hours. The mass became very well pulped in this interval and turned a very dark brown in color.

The hot paste-like mass at the end of this cooking period was decanted into a Buchner vacuum funnel. In spite of the gelatinous character, it filtered readily and after washing several times with hot water to remove caustic became a faintly gray translucent cake with a few tan specks. The moist neutral filter cake was transferred to the reactor, dispersed in 700 ml of water while stirring, and about 3-4 grams of chlorine were injected into the mixture. The bulk of the material turned white rapidly, the dark specks disappearing in about three hours. At this time the dispersion was heated to rid it of chlorine and it was filtered hot and washed with hot water until the washings were neutral. The filter cake was pumped as free of water as practicable.

The moist cake was dispersed in about 250 ml of hot methanol and after holding for 10 minutes the somewhat jelly-like mass was decanted into a filter using additional hot methanol to effect the transfer. A bit of sand and grit was again separated. The dispersion in methanol, heating, and decanting into a filter was repeated twice more to simulate a countercurrent extraction. The resultant filter cake was freed of solvent by holding at 30° C. under vacuum. The product, faintly grayish, amounted to 11.2 gms or a yield of about 18.7%.

The product ground to pass a 100 mesh screen in a hand mortar was submitted to proximate assay. The moisture content was 5.08%. The other characteristics calculated to bone dry basis were as follows: crude fiber 50.3%; ash 6.26%; lipids 0.86%; crude protein 0.38%; cellulose 92.2%.

This beet cellulose produced in quantity should be milled and air classified to remove some of the grit and heavy extraneous materials which contribute to the high ash figure noted above. There does appear to be some unextractable silica ingredient, however. The beet cellulose is of good quality but obtaining it requires more operational costs of a non-chemical nature because of the problems with respect to extraneous foreign matter. It is functional as a filler but differs materially from the legume cellulose in certain physical aspects.

EXAMPLE 8

The hulls obtained from two types of edible legumes have been hereinbefore described as yielding suitable cellulose by the process forming the basis of the present invention. Edible peas and beans are not usually decorticated for eating though this is common for soybeans and field peas. However, vigna unguiculata varities and closely related species of edible peas and beans are dehulled in Africa to be cooked to form a popular food called "Akara". These vigna unguiculata species are common in the United States and are known as cowpeas, Crowder beans and black-eyed peas. Here, they are usually eaten intact or mashed, but, as hereinbefore indicated, in Africa they are dehulled either by mortaring, sometimes mechanically, or soaking and removing the hulls by hand or floatation. It has been found that the soaking and flotation, starting with readily available black-eyed peas, yields approximately 5% of air dried hulls suitable for processing in accordance with the present invention.

Forty grams of 20 mesh ground black-eyed pea hulls were dispersed in a liter reactor in about 300 ml of water to get a mixable slurry, and this was saturated with gaseous chlorine. After standing for six hours at 21° C., oxidation and chlorination were completed. The reaction mixture was stirred and heated to remove the small amount of excess free chlorine and was then stirred at a moderate rate to prevent scorching and cooked at mild reflux for 2.5 hours. The cooked reaction mixture was then filtered through a Buchner funnel while hot and washed with hot water until the washings became neutral.

The resulting filter cake was returned to the reactor, slurried in 200 ml of water, again chlorinated and allowed to stand about 12 hours. The reaction mixture was stirred and heated until free of chlorine by test with starch KI paper in the head space. The hot solution was then raised to pH of at least 10 by addition of sodium hydroxide solution, such addition being about 2.5-3.0 grams of the base. The caustic mixture was stirred and heated to mild reflux temperature on the order of 100° C. for 90 minutes. The resulting mixture was then filtered hot and washed with hot water until the strong caustic was removed.

The filter cake was returned to the reactor and slurried with 150 ml of water and treated briefly with chlorine. It bleached white very rapidly. The mixture was thereafter heated to remove the excess chlorine. The slurry was thereafter filtered hot and was washed with hot water to a neutral reaction.

The cake was pumped as free of water as practicable and thereafter dried in an oven. The resulting white product in dry form was transferred back to the reactor and slurried with 150 ml of isopropyl alcohol. This mixture was then stirred and boiled for 15 minutes and then vacuum filtered. The filter cake was then rinsed several times with hot isopropyl alcohol. The resultant cellulose, yellowed in color, was dried in an oven at 80° C. The yield was 32% based on the weight of the air dried hulls used. The analytical characteristics were as follows: moisture content 1.54%, and on a bone dry basis, the powdered cellulose had crude fiber 65.6%; ash 2.96%; crude lipids 1.11%; crude protein 1.12%; cellulose 95.8%. Physically, the fiber of the cellulose produced from the black-eyed pea hulls closely resembles the fiber of cellulose from soybeans in that the fibers are quite short, i.e., about 35-40 microns in length and about 0.10 that in diameter.

EXAMPLE 9

In an effort to obtain information with respect to the content of the filtrates from each of the filter and wash operations shown in FIG. 1 so as to provide conclusions with respect to water usage and disposal, the process disclosed in Example 3 was carried out three separate times with the first operation being terminated at the end of the first Filter & Wash step of FIG. 1, the second operation being terminated at the end of the second Filter & Wash operation step shown in FIG. 1 and the third operation terminated at the end of the third Filter & Wash operation shown in FIG. 1.

With each operation the solids, largely cellulose which were more or less pure, were dried and weighed. The filtrate from each of the three operations were taken to dryness by heating under vacuum and the solids contents were determined. The results obtained from each of the three operations are tabulated below as obtained from 40 grams of ground soybean hulls.

| Termination Point | Cellulose Fraction | % of Original | Extractives | % of Original |
|---|---|---|---|---|
| 1st Operation | 22.2 gm. | 56% | 16.0 gm. | 40% |

-continued

| Termination Point | Cellulose Fraction | % of Original | Extractives | % of Original |
|---|---|---|---|---|
| 2nd Operation | 17.8 gm. | 45% | 7.9 | 20% |
| 3rd Operation | 17.6 gm. | 44% | .5 | 1% |

The first cellulose-rich preparation was tan in color and had an appearance rather like a pale powdery cocoa and it was considerably darker than the starting soybean hull material. It was obvious that of the total of extractives, 22.4 gms, that 17.8 gms, or 79% were removed in the first Filter & Wash cycle. This amount of solids in the first filtrate, without the wash water, would provide a solids loading of about 8% which is substantially organic except for mineral extracted from the hulls or present in the water. Disposal of the material would present excess biological oxygen demand.

The cellulose-rich material which had been obtained from the second operation is a pale tannish color similar to the powder color of untreated ground hulls and was substantially pure except for a trace of color and some lipid. The solids from the extract were brown in color and partially organic but were also high in ordinary salt which originated from the oxidation with chlorine followed by the caustic treatment. The solids loading was about 4% and apparently a third of this was salt. Disposal as sewage material might present a problem and the salt might make reuse also a problem.

The cellulose from the third operation was the substantially pure product of this invention with a trace of lipid. The extracts at this stage contained a trace of color but could obviously be used as the fluids in any of the Dispersing and Oxidizing steps in FIG. 1.

EXAMPLE 10

A series of four preparations was made using the process of Example 4 but with the exception that 300 ml of water was initially used and except that the filtrate from the first Filter & Wash operation of FIG. 1 was reused in the first Disperse & Oxidize step with just enough wash water added to return the volume to the original 300 ml, this operation being carried out in accordance with the process shown in FIG. 2.

The same water was thus used four times and it was calculated that the solids content of the final solution was somewhere about 20-25%. The processing of these four preparations was taken to the final cellulose production substantially as described in Example 4. The final yields, all of satisfactory cellulose powder are shown in the table following.

| Preparation | Water | Yield-gms | Percent of Soy Hull |
|---|---|---|---|
| 1 | fresh | 15.8 | 40% |
| 2 | 1 reuse | 15.4 | 39% |
| 3 | 2 reuse | 15.9 | 40% |
| 4 | 3 reuse | 16.5 | 41% |

The saving in water by such reuse, whether two or many times, is obvious. Further, treatment of the final extract by passage through an ion exchange column composed of Rohm & Haas' Armberlite IRA-93 reduced its pH to 5 plus. At this acidity, dehydration of the material yielded a syrup directly applicable for use in animal feed or it could be used as such as a substrate or growth medium for a suitable microorganism.

COMPARATIVE DATA

To permit comparison between the purified celluloses made in accordance with the present invention and a currently available hardwood cellulose, a sample of BH-200 from International Filler Co., North Tonowanda, N.Y., was submitted to the same series of AOAC analyses as those previously reported. The material had a moisture content of 4.20%. The other characteristics as determined on a moisture free basis were: crude fiber 82.0%; ash 0.33%; crude lipids 1.90%; crude protein 0.60%; cellulose 97.1%.

The "crude fiber" of the hardwood cellulose as determined is higher and the ash slightly lower generally. These reflect the difference in the physical nature of the celluloses and their sources and are neither detrimental or beneficial to the end useage of the cellulose powder of themselves.

Cellulose in situ in plant materials is undoubtedly a natural polymer variously united into the plant structure by different types of chemical bonds. It is highly unlikely that the nature of the cellulose is not altered by the rather drastic oxidation and hydrolytic treatments of the instant process. The cellulose of this invention, from different sources, differ materially in physical properties from celluloses from more traditional sources.

Microscopic specimens of various celluloses were prepared, specimens were dusted onto a surface of "double stick" tape, placed on a specimen stab and sputter coated by a 200 Å layer of gold. They were then observed directly with a scanning election microscope and areas considered representative were photographed. Dimensions of particles in these areas were measured. Measurements and crude fiber determinations of the samples are presented in Table 2.

TABLE 2

| Cellulose Source | State | Ave. Width | Ave. Length | Crude Fiber |
|---|---|---|---|---|
| Soybean hulls | Underground | 10μ | 42μ | 71.0% |
| Field pea hulls | Underground | 13 | 44 | 70.0% |
| Corn Bran | Underground | 26 | 93* | 57.2% |
| Beet pulp | Underground | —* | —* | 50.3% |
| Hardwood (BH 200) International Filter Corp. | Ground | 38* | 62* | 82.0% |
| Chemical Cotton (Type P-69) Hercules, Inc. | Underground | 23 | 800* | — |
| Softwood (West Coast) Georgia Pacific | Underground | 51 | 500* | — |

*Highly variable

Certain pertinent observations were made which are not adapted to tabular presentation. The soy hull cellulose were very regular in size and resemble logs in shape. Field pea hull cellulose was very similar in size and shape but had a definite bulbous characteristic at one end. The corn bran product was quite irregular and largely debris. A few relatively intact fibrils appear like very thin ribbons or soda straws which had been flattened or crumpled. A few apparently intact ribbons were 200 microns long. The beet pulp cellulose was mostly debris. The few distinctive particles appear slablike and about 15μ × 125μ. The ground hardwood cellulose was shattered material originating from thick ribbons apparently of about the width indicated. The chemical cotton had a twisted rope appearance. The unground softwood cellulose was apparently somewhat coarser than hardwood but otherwise similar. Thickness of the fibers could only be judged by the appearance of twisted portions because end views were not obtained. There was definite evidence that there is an inverse correlation between the surface area exposed to the reagents of the "crude fiber" determination and the "crude fiber" recovery. This is a new but not unexpected observation.

The powdered cellulose made in accordance with the present invention by reason of its fineness and very large surface area promises new applications which have not been served by previously available cellulose materials. In its properties it appears to be somewhere between the conventional powdered celluloses and the microcrystalline cellulose. It is therefore considered that the cellulose produced in accordance with the present invention is a new and useful article of manufacture.

I claim:

1. The purified short fiber cellulose product from the hulls of edible legumes and suitable for human consumption produced by the process comprising oxidizing the particulate, relatively non-ligneous lipid-free legume hulls in a particulate state in a water slurry with chlorine, cooking said slurry at a temperature and for a time sufficient to solubilize the greater amount of non-cellulose material present in the legume hulls, separating the formed pulp therefrom, redispersing the pulp in water to form a further slurry and oxidizing same with chlorine, heating the oxidized slurry at a temperature sufficient to remove free chlorine, adding sodium hydroxide to render the slurry strongly basic and cooking the basic slurry at a temperature and for a time sufficient to digest non-cellulosic material present therein, separating the pulp therefrom, reslurrying the pulp in water and oxidizing same with chlorine, heating the slurry at a temperature sufficient to remove excess chlorine, reseparating the pulp therefrom, extracting the water-moist pulp with an excess of a water miscible solvent and drying the moist pulp to produce a dried pulp product of substantially pure cellulose which may be ground to produce an edible cellulose powder product, said cellulose product being characterized by having a configuration, when in a powdered state and under an electron microscope magnification, generally resembling a log and with the product particles being generally regular in size.

2. The purified short fiber cellulose product from the hulls of edible legumes and suitable for human consumption produced by the process comprising oxidizing the particulate, relatively non-ligneous lipid-containing legume hulls in a particulate state in a water slurry with chlorine, cooking said slurry at a temperature and for a time sufficient to solubilize the greater amount of non-cellulose material present in the legume hulls, separating the formed pulp therefrom, redispersing the pulp in water to form a further slurry and oxidizing same with chlorine, heating the oxidized slurry at a temperature sufficient to remove free chlorine, adding sodium hydroxide to render the slurry strongly basic and cooking the basic slurry at a temperature and for a time sufficient to digest non-cellulosic material present therein, separating the pulp therefrom, reslurrying the pulp in water and oxidizing same with chlorine, heating the slurry at a temperature sufficient to remove excess chlorine, reseparating the pulp therefrom, extracting the water-moist pulp with an excess of a water miscible solvent effective for removal of lipids and drying the moist pulp to produce a dried pulp product of substantially pure cellulose which may be ground to produce an edible cellulose powder product, said cellulose product being characterized by having a configuration, when in a powdered state and under an electron microscope magnification, generally resembling a log and with the product particles being generally regular in size.

3. The purified short fiber cellulose product suitable for human consumption produced by the process comprising oxidizing a lipid free, cellulose-containing material selected from the group consisting of soybean hulls and field pea hulls in a particulate state in a water slurry with chlorine, cooking said slurry at a temperature and for a time sufficient to solubilize the greater amount of non-cellulose material present in the selected cellulose-containing material, separating the formed pulp therefrom, redispersing the pulp in water to form a further slurry and oxidizing same with chlorine, heating the oxidized slurry at a temperature sufficient to remove free chlorine, adding sodium hydroxide to render the slurry strongly basic and cooking the basic slurry at a temperature and for a time sufficient to digest non-cellulosic material present therein, separating the pulp therefrom, reslurrying the pulp in water, and oxidizing same with chlorine, heating the slurry at a temperature sufficient to remove excess chlorine, reseparating the pulp therefrom, extracting the water-moist pulp with an excess of a water miscible solvent and drying the moist pulp to produce a dried pulp product of substantially pure cellulose which may be ground to produce an edible cellulose powder product, said cellulose product being characterized by having a configuration, when in a powdered state and under an electron microscope magnification, generally resembling a log and with the product particles being generally regular in size.

4. The purified cellulose product in accordance with claim 3 wherein the cellulose-containing material employed as the starting material is soybean hulls.

5. The cellulose product in accordance with claim 3 wherein the cellulose-containing material employed as the starting material is field pea hulls.

6. The purified short fiber cellulose product suitable for human consumption produced by the process comprising oxidizing a lipid containing cellulose-containing material selected from the group consisting of soybean hulls and field pea hulls in a particulate state in a water slurry with chlorine, cooking said slurry at a temperature and for a time sufficient to solubilize the greater amount of non-cellulose material present in the selected cellulose-containing material, separating the formed pulp therefrom, redispersing the pulp in water to form a further slurry and oxidizing same with chlorine, heating the oxidized slurry at a temperature sufficient to remove free chlorine, adding sodium hydroxide to render the slurry strongly basic and cooking the basic slurry at a temperature and for a time sufficient to digest non-cellulosic material present therein, separating the pulp therefrom, reslurrying the pulp in water and oxidizing same with chlorine, heating the slurry at a temperature sufficient to remove excess chlorine, reseparating the pulp therefrom, extracting the water-moist pulp with an excess of a water miscible solvent effective for removal of the lipids and drying the moist pulp to produce a dried pulp product of substantially pure cellulose which may be ground to produce an edible cellulose powder product, said cellulose product being characterized by having a configuration, when in a powdered state and under an electron microscope magnification, generally resembling a log and with the product particles being generally regular in size.

* * * * *